US008782680B2

United States Patent
Cook et al.

(10) Patent No.: US 8,782,680 B2
(45) Date of Patent: Jul. 15, 2014

(54) METHOD AND APPARATUS FOR DISPLAYING INTERACTIONS WITH MEDIA BY MEMBERS OF A SOCIAL SOFTWARE SYSTEM

(75) Inventors: Thomas E. Cook, Essex Junction, VT (US); Peter G. Finn, Brampton (CA); Martin G. Kienzle, Briarcliff Manor, NY (US); Paul J. Ledak, Williston, VT (US); Paul B. Moody, Hyde Park, VT (US); Alan M. Webb, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 918 days.

(21) Appl. No.: 12/131,726

(22) Filed: Jun. 2, 2008

(65) Prior Publication Data

US 2009/0300680 A1     Dec. 3, 2009

(51) Int. Cl.
*H04H 60/33* (2008.01)
*G06F 3/00* (2006.01)
*G06F 13/00* (2006.01)
*H04N 5/445* (2011.01)

(52) U.S. Cl.
USPC ............ 725/9; 725/10; 725/11; 725/46

(58) Field of Classification Search
None
See application file for complete search history.

(56) References Cited

U.S. PATENT DOCUMENTS

| | | | | |
|---|---|---|---|---|
| 7,260,823 | B2* | 8/2007 | Schlack et al. | 725/9 |
| 7,441,260 | B1* | 10/2008 | Kurapati | 725/46 |
| 7,603,683 | B2* | 10/2009 | Reto | 725/34 |
| 7,634,790 | B2* | 12/2009 | Finseth et al. | 725/46 |
| 2004/0255321 | A1* | 12/2004 | Matz | 725/14 |
| 2007/0157242 | A1* | 7/2007 | Cordray et al. | 725/46 |

* cited by examiner

*Primary Examiner* — Nasser Goodarzi
*Assistant Examiner* — Fred Peng
(74) *Attorney, Agent, or Firm* — William Stock (57) ABSTRACT

A media viewing method and system monitors user interaction with an electronic program guide. An awareness engine collects data generated by the user interaction and forms awareness indicators and information. The awareness information is output to end users and is indicative of which users in a social circle are accessing (e.g. viewing, playing, or recording) or have accessed which media works. Some output enables user-to-user interaction. The media works may be supplied by cable television, satellite television, online or global computer network sources.

20 Claims, 11 Drawing Sheets

METHOD AND APPARATUS FOR DISPLAYING INTERACTIONS WITH MEDIA BY MEMBERS OF A SOCIAL SOFTWARE SYSTEM

BACKGROUND

Cultural alignment is formed when members of a society share cultural content such as stories, music, events, etc. As more of our cultural content is experienced in isolation on media devices such as TV's, or personal computers, knowing who has seen or experienced the cultural content has become difficult.

BRIEF SUMMARY

The present invention addresses the foregoing problems and effectively provides an overlay or other coupling of interactions with media (including but not limited to virtual world events, web based content, or channels of distribution of the same) that is displayed in the context of an electronic program guide (EPG). Through use of this display, system users can know which of their social network has seen, will see, recommends or rated the media (or channels) presented in the EPG. In this way, the present invention EPG provides real-time awareness and a type of 2-way communication among the users.

In one embodiment, an Electronic Program Guide (EPG) display includes indications of interaction with shows (media works) by members of a user's social network, or system's global population. The interactions that are indicated, represented, or otherwise displayed in the EPG may be (but not limited to): setting a dvr record event, show has been viewed, show has been recommended, show has been rated, show is currently being watched, show is currently being watched by more than one party synchronized, show is currently being watched in a VR (virtual reality) environment by multiple parties. The system allows for inspection of these interactions to determine who is interacting and when.

The invention system collects data on the interaction with media and events by users and then overlays indications of the collected data on an EPG display. The data collected includes for a particular piece of content (media work) or channel— who has watched/played it, who has requested more info, who has scheduled a recording (pertains to scheduled content), who has recommended the content, who has rated the content, who is currently interacting with the content or content contained in a channel.

The system provides ways to inspect exactly who and when the interactions occurred. The system further provides in-context features to facilitate social interactions (recommending, rating, chatting/conference calling, coordinated viewing, etc.).

BRIEF DESCRIPTION OF THE SEVERAL VIEWS OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1A:
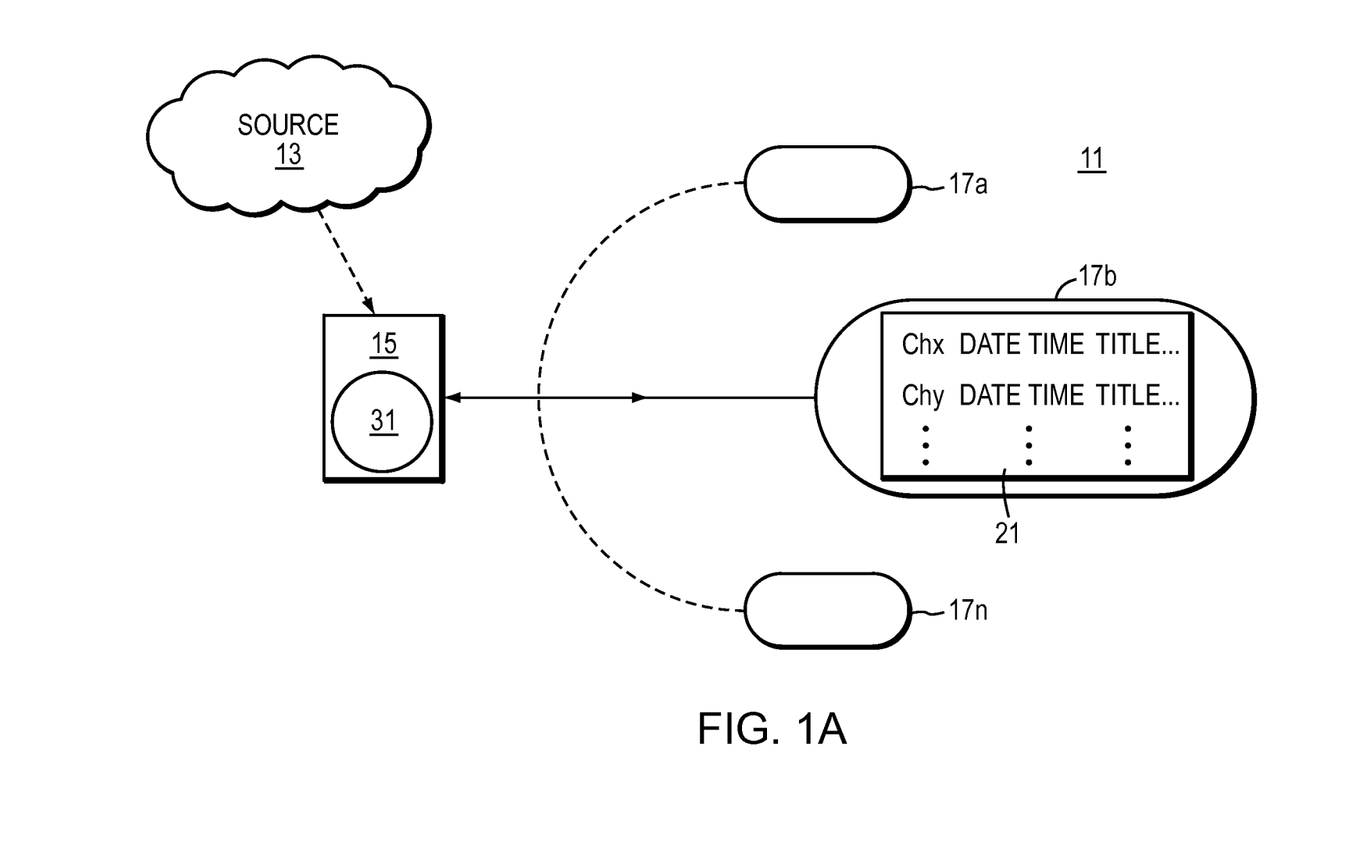
FIG. 1a-1b are schematic diagrams of one embodiment of the present invention.
Figure 1B:
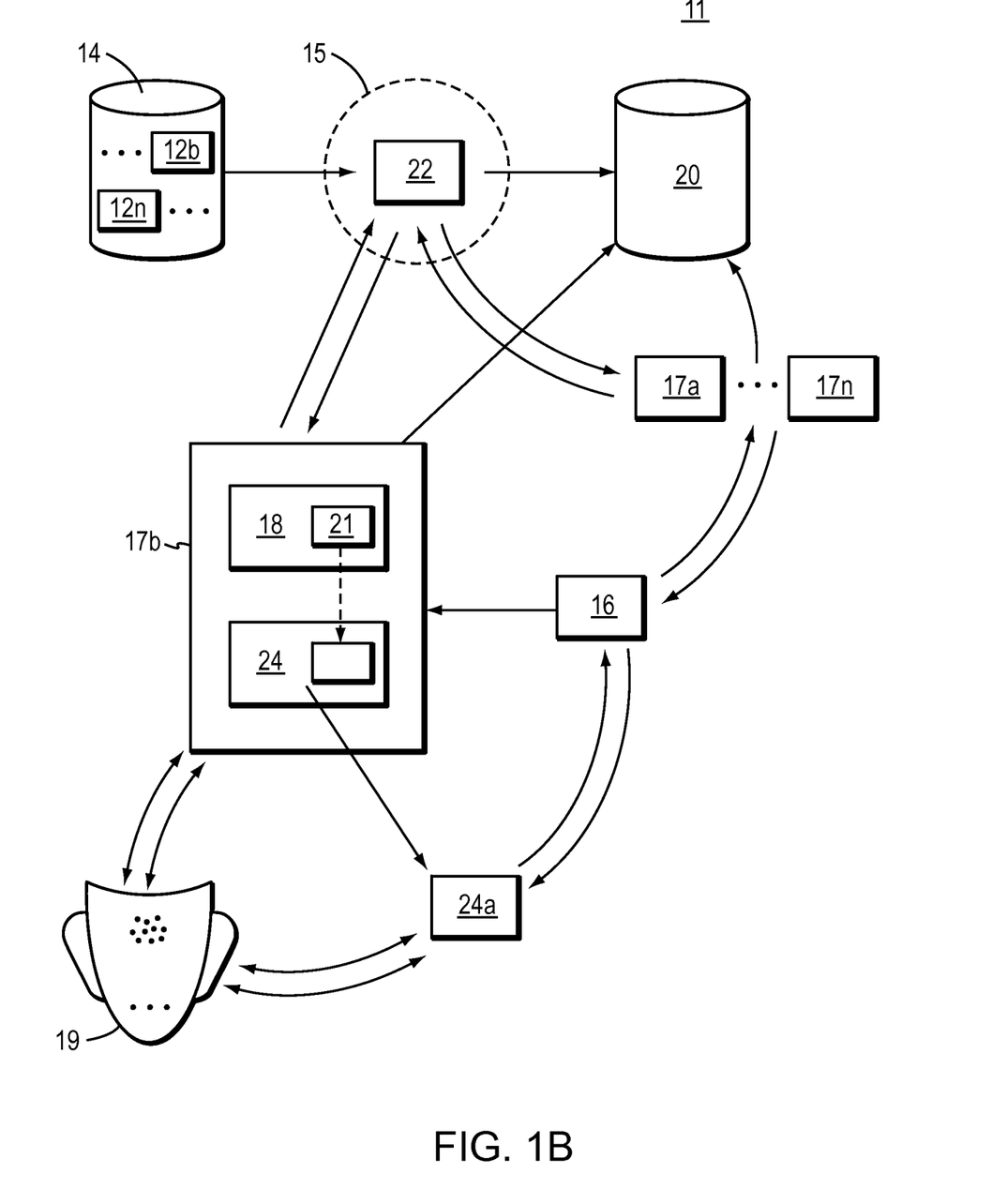

With reference to FIGS. 1a-1b, in a media system 11 that consumes broadcast content, sources 13 of programming guide information are accessed and program guide information is collected. The collected program guide information is displayed as an electronic program guide (EPG) 21 typically in a tabular format. In the illustrated exemplary EPG 21, each row or entry of the table indicates play date/time, channel and title of a media work (TV show; movie/video; other video works including video games, online events, virtual world sessions; audio works, music pieces, etc.). The media system 11 may be formed of a cable television network, satellite dish network, global computer network (on line) media system and the like having a media server or provider 15. End-users media player nodes (television, computer or other devices) 17a, b . . . n are coupled for communication with server 15. End-users may register with system 11 and form social groupings or circles (detailed below).

The invention system (media awareness engine) 31 collects information on individual device 17 interaction with the media listed in the EPG 21 and associates that data with a particular registered user of the media system 11. That is, for each program (media work) listed in the EPG 21, the invention engine 31 monitors individual device 17 interaction with the media work. When a user selects the media work (listed in the EPG 21) for presentation, the invention engine 31 collects data indicative of the user, the individual device 17 on which the selected media work is presented/displayed, the date/time of media display or use by the user, length of time (or percent) viewed, and the like.

The invention engine 31 partitions the registered users of media system 11 into 'social circles' that can limit awareness of interactions to a range of social circles (for example: family and friends, others, and all users of system 11).

The awareness engine 31 provides ways of controlling which interactions are shared (per media item or channel), which elements (portions) of the collected data about the interaction are shared (for example: percent viewed, when viewed, if viewed synchronized and with whom), and with whom it is shared (private, friends and family, others, everyone, etc.).

Turning now to FIG. 1b, media system 11 is shown and described in more particular part. Various media works 12 are stored in a content data store (database) 14. From the data store 14, a media work 12 is made available for distribution by servers 15 to end user nodes/devices 17.

Awareness engine 31 employs a program guide subsystem 22 and EPG processor/display generator 18 to create electronic program guides (EPG) 21 of the present invention. When a device 17b requests an EPG 21, the program guide subsystem 22 retrieves history and live status from a history/status database 20. The history/status database 20 contains records of devices 17a, . . . n history and device 17a, . . . n live status. The EPG processor and display generator 18 integrates the retrieved history and status data with program information, and provides the resulting EPG 21 to display screen views 24 of the requesting device 17b.

Device 17b may also request history and status data directly from database 20. Upon receipt of the requested data, device 17b produces display screen views 24a showing history and status for user-selected media work(s) 12.

Figure 2A:
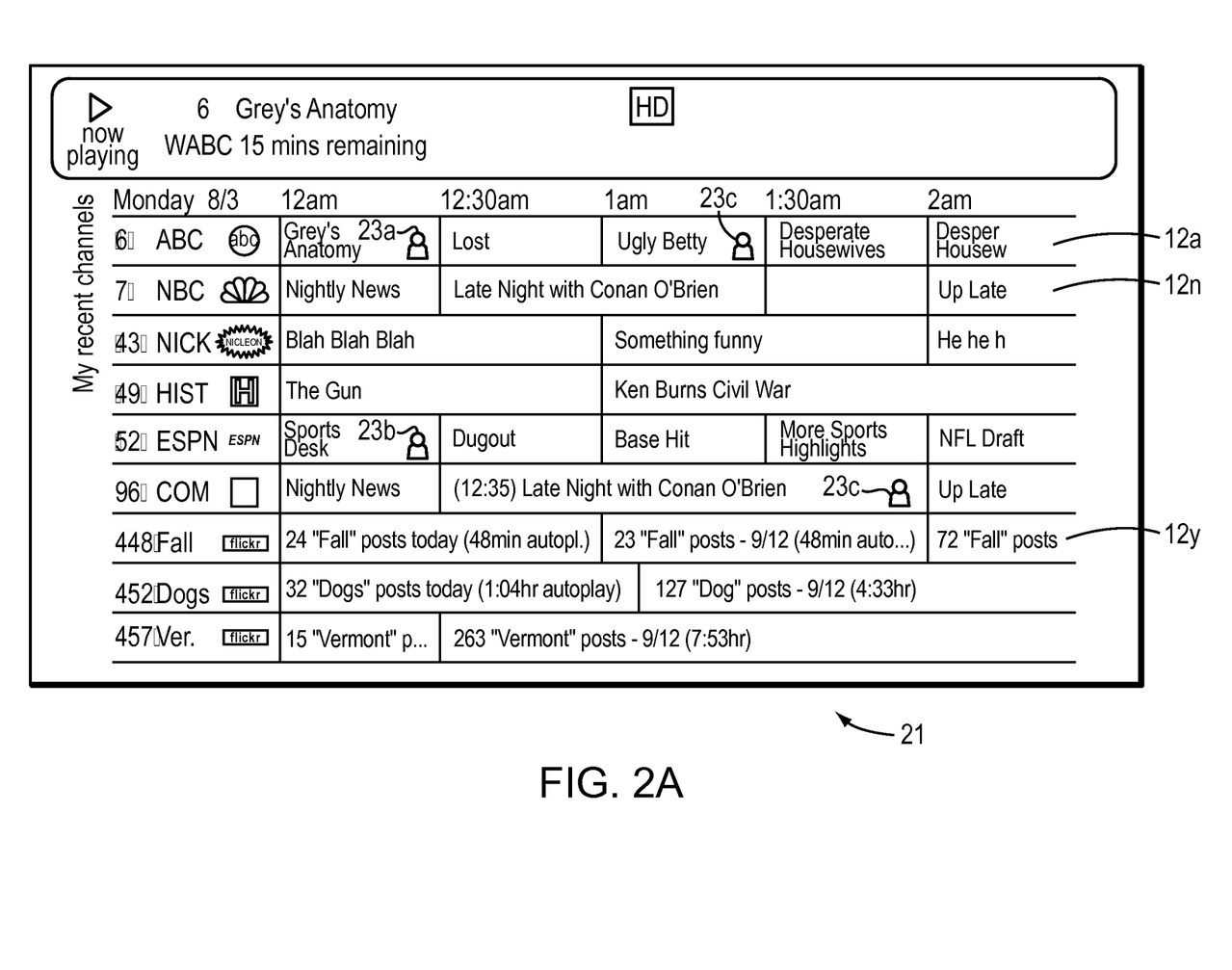
FIGS. 2a-2e are schematic views of screen displays in the embodiment of FIGS. 1a-1b.
Figure 2B:
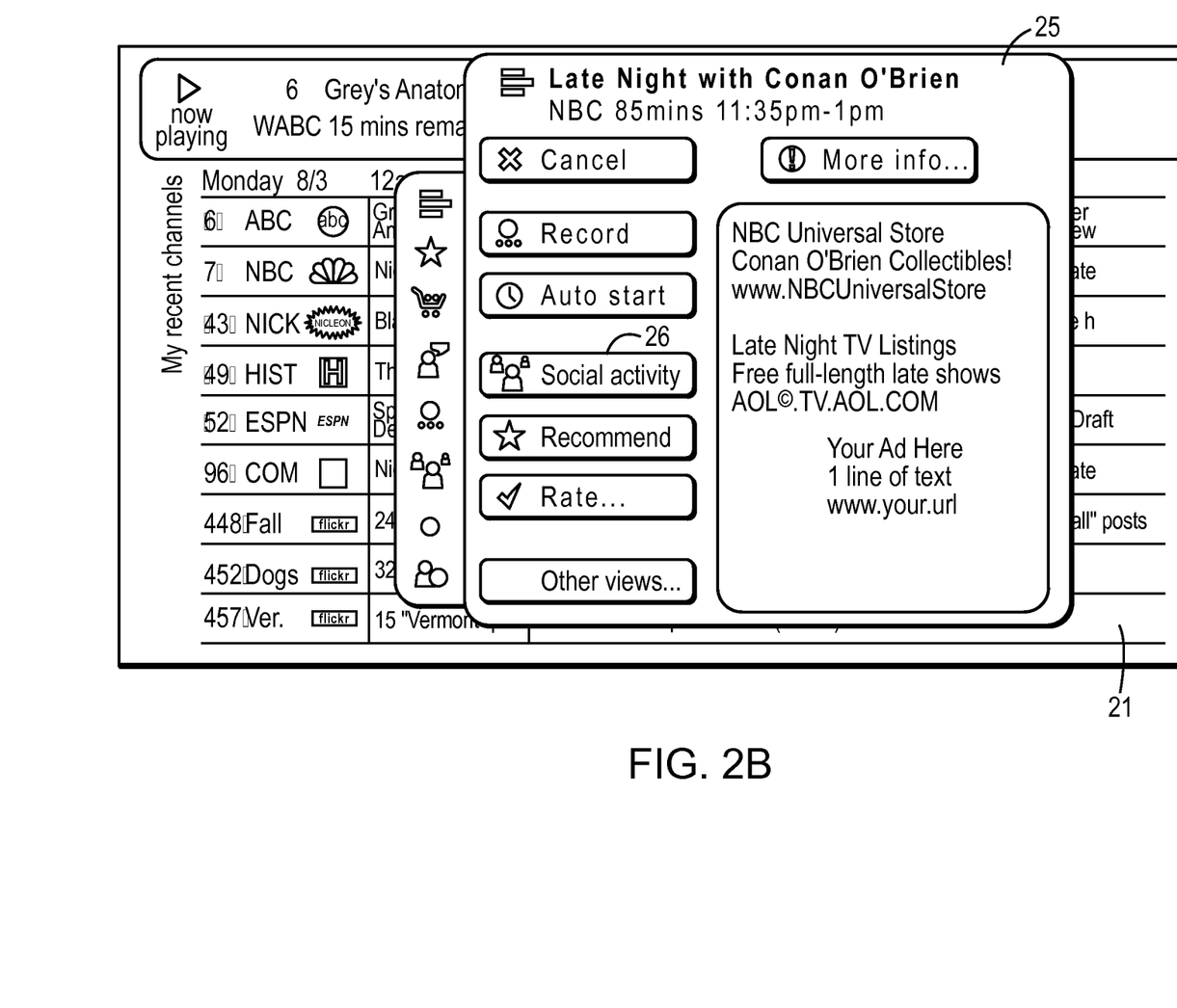

Accordingly the invention awareness engine 31 provides a way to display various kinds of social interactions directly in the EPG 21. For example, FIG. 2a illustrates social activity and presence awareness information integrated into the electronic program guide 21 using "people" shaped icons 23. There are four "people" shaped icons 23 overlaying the program titles in the illustrated EPG table. The meaning of the icons 23 are:

dark icon 23a=someone you know has watched this in the past, green icon 23b=someone you know is watching this program right now, and hollow shape 23c=someone you know has programmed their alerts, alarms or personal video recorder to remind them of or to capture this show in the future.

Additional or other symbols, indicia, representations and icons are suitable including (but not limited to) use of other color schemes, design schemes (stripes, patterns, etc), other geometries, movement, (e.g., flashing, fading in/out, etc.) and the like.

As illustrated in FIGS. 2b-2e, the invention engine 31 may provide additional display views 24 and user interface that leverage this data. For example, in FIG. 2b a user interface palette 25 presents buttons representing possible options with respect to a user selected media work 12 from the EPG 21 of FIG. 2a. One button 26 might be for initiating display of social history of a subject media work. In the illustrated example, one can inspect the social history of a show or program by choosing (operating) the Social Activity button 26. Responsive to user operation of Social Activity button 26, awareness engine 31 displays a dialog box 27 for example in FIG. 2c. Dialogue box 27 shows who has previously watched the subject media work 12, who is watching now, and who plans to watch in the future.

Figure 2C:
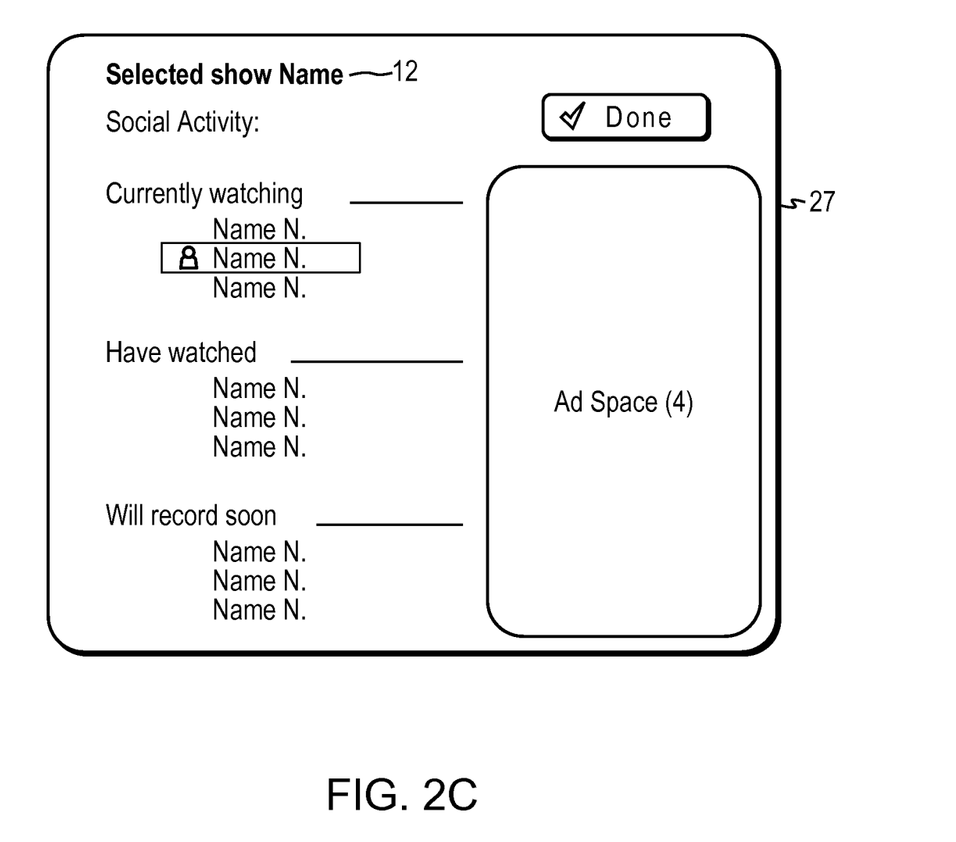
Figure 2D:
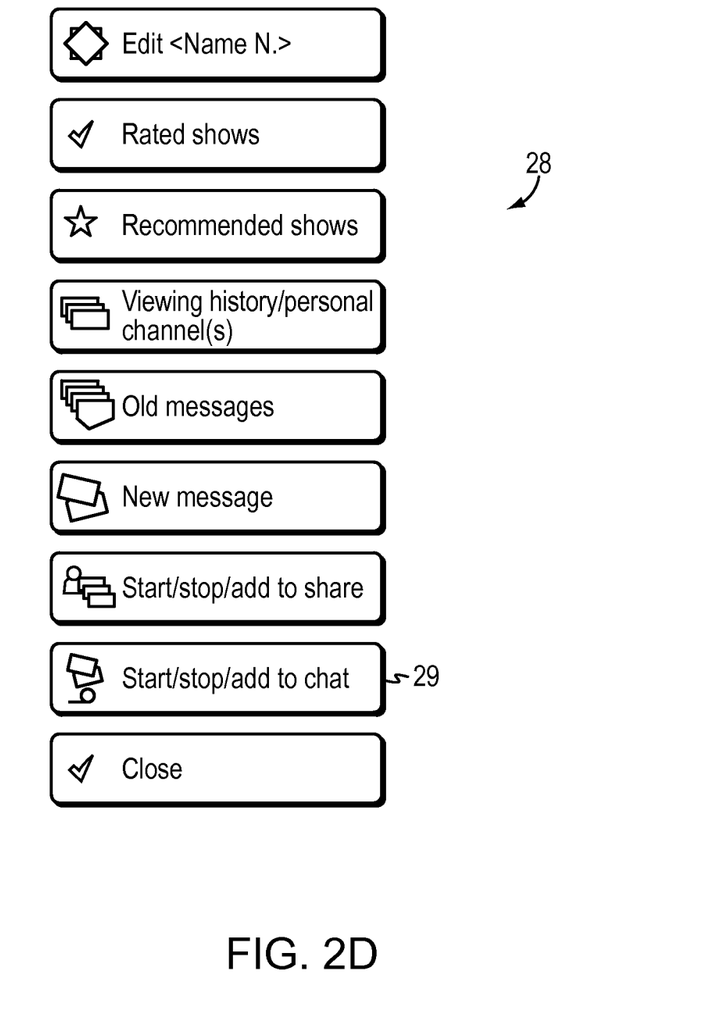
Figure 2E:
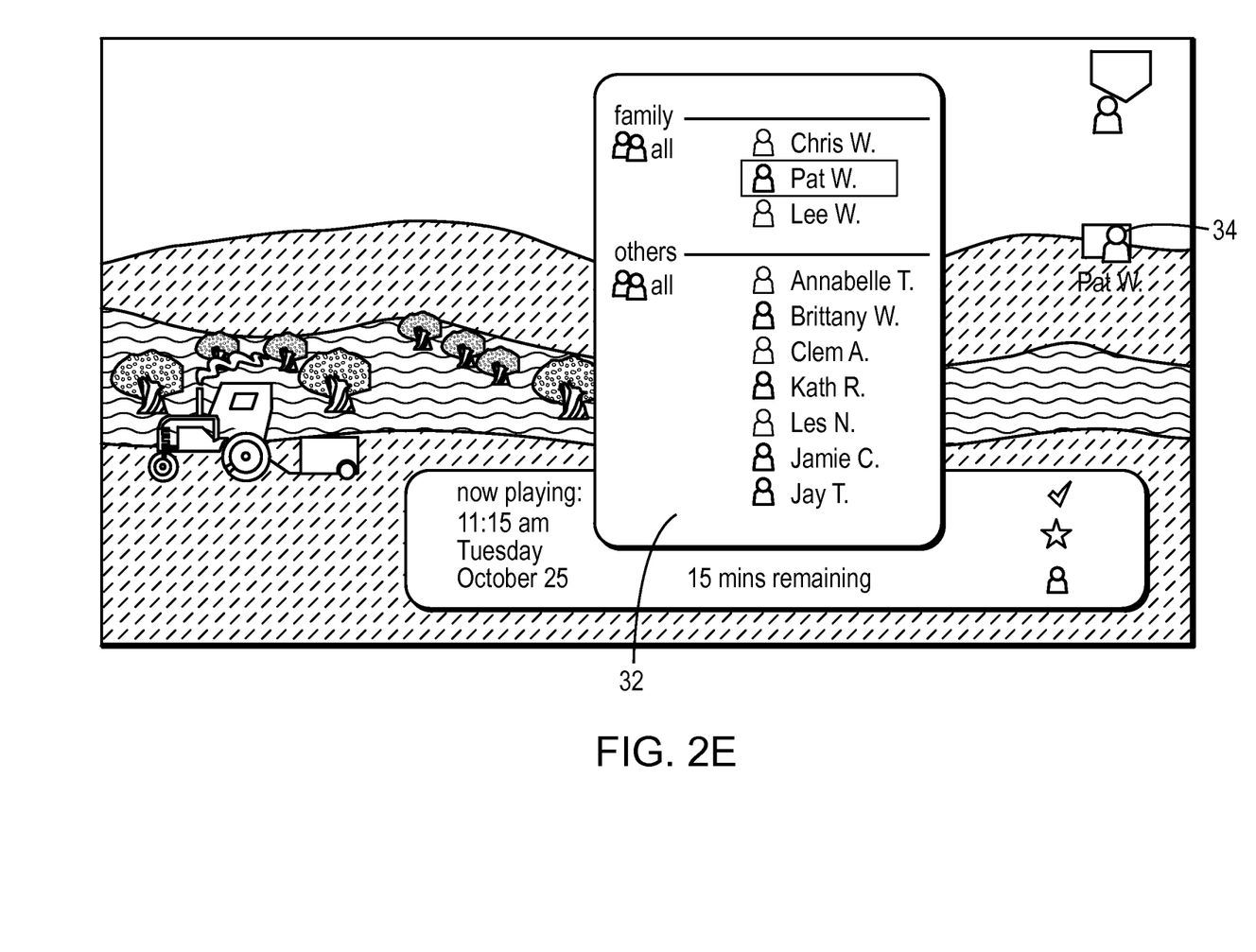

For each user name listed in the Social Activity dialog 27, there are options for further information, communication or interaction. FIG. 2d is illustrative of a listing of these options 28. Of note is the ability to "start/stop/add to chat" (option) 29. Chat in this sense is a novel "voice over internet protocol" (VoIP) conference call between users of local set top boxes (further detailed below). Briefly, FIG. 2e shows how an ongoing chat (VoIP conference call between remote controls 19 of devices 17) is indicated on screen while a session is active. Embodiments may display a menu 32 for listing showing names of who is in the chat (conference call) while it is ongoing. A sub-menu (not shown) allows to end the call for a person selected in the menu 32 (i.e. kick that user out of the call) or to isolate the call to just a certain user (i.e. whisper something to just him).

In the illustrated example, the right most icon labeled "Pat W." is the icon 34 representing the active chat session (conference call). If there are multiple people, the name of the last person joining displays for about 20 seconds (for example) and then the name space of icon 34 indicates how many parties are in the call, i.e., "3 in Chat". Other design configurations for indicating the VoIP call/chat sessions are suitable.

Continuing with FIG. 1b, as mentioned device 17b screen views 24, 24a offer the option to create voice over IP conference calls with other users at nodes 17a, . . . n. This is accomplished using a voice over IP system 16 or similar technology. Such a conference call causes device 17b to display names of parties involved in the conference call. In some embodiments, the user of device 17b is able to interact with the VoIP call through a remote control 19 with integrated microphone and speaker as illustrated in FIG. 6.

Figure 6:
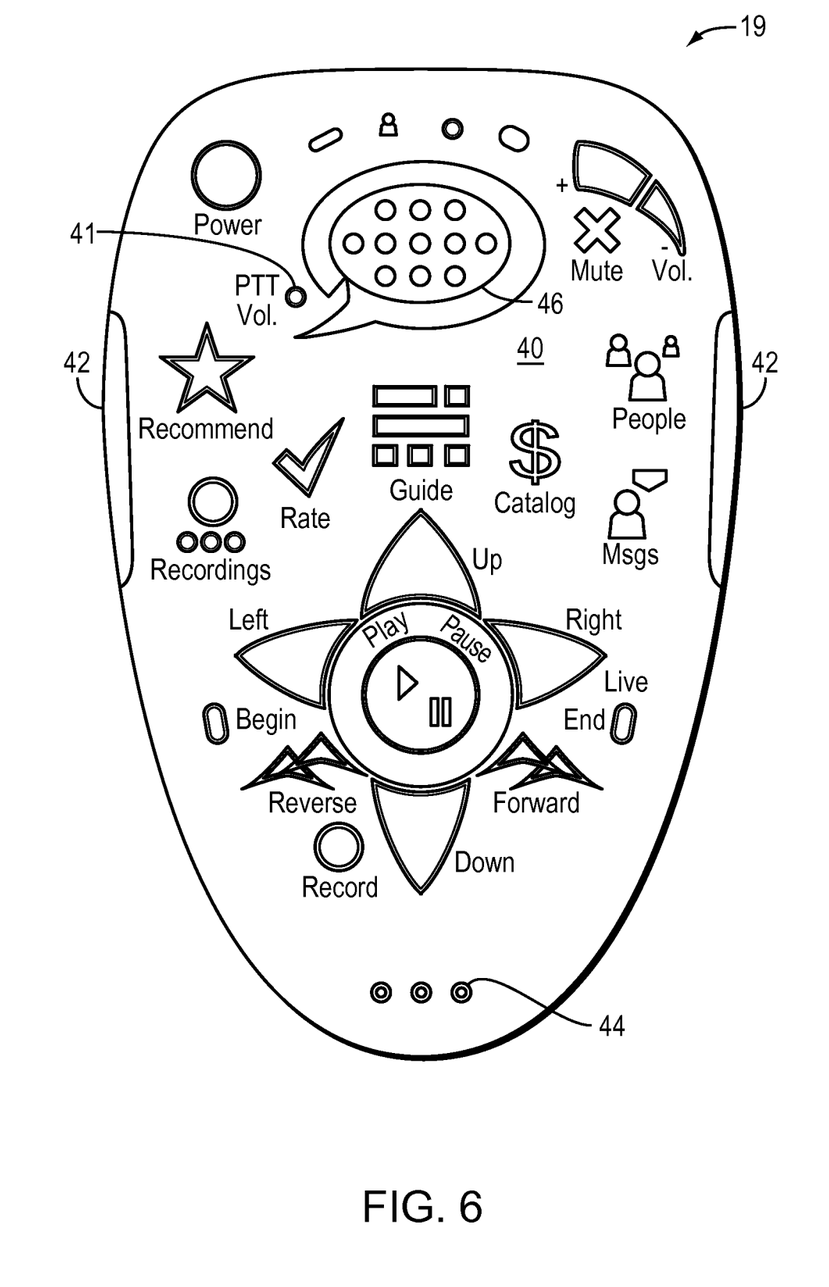
FIG. 6 is a schematic illustration of a remote control unit of embodiments of the present invention.

Turning to FIG. 6, illustrated is a handset 19 for conference calling in the media system 11 according to principles of the present invention. The handset 19 is a modified wireless remote control (e.g. employing Bluetooth or other short range radio), namely with added microphone 44 and speaker 46. The handset/remote control 19 has only 'push to talk' operation as the way of transmitting local sound to the other devices 17 in the VoIP conference call. The preferably small speaker 46 (with volume control) renders/plays incoming sound from the conference call. It is important to note, that the two way conversation is not mixed into the sound of the television or sound system used for programs and shows (subject media works 12). The conference call driven audio is only handset remote control 19 to handset remote control 19. In the FIG. 6 example embodiment, two side switches 42 (thin vertical curved switches that protrude from remote body 40) are the push-to-talk switches. The microphone 44 is formed at three small holes at the bottom of remote body 40. The speaker 46 is the group of holes near the top center of remote body 40. Adjacent to the speaker 46 is a single push button 41 that cycles through volume levels for the speaker 46 and remote control 19 (i.e. 1 push=off, 2 pushes=volume low, 3 pushes=volume medium, etc.—one can keep pushing over and over again to serially cycle through a range of volume levels).

Figure 3:
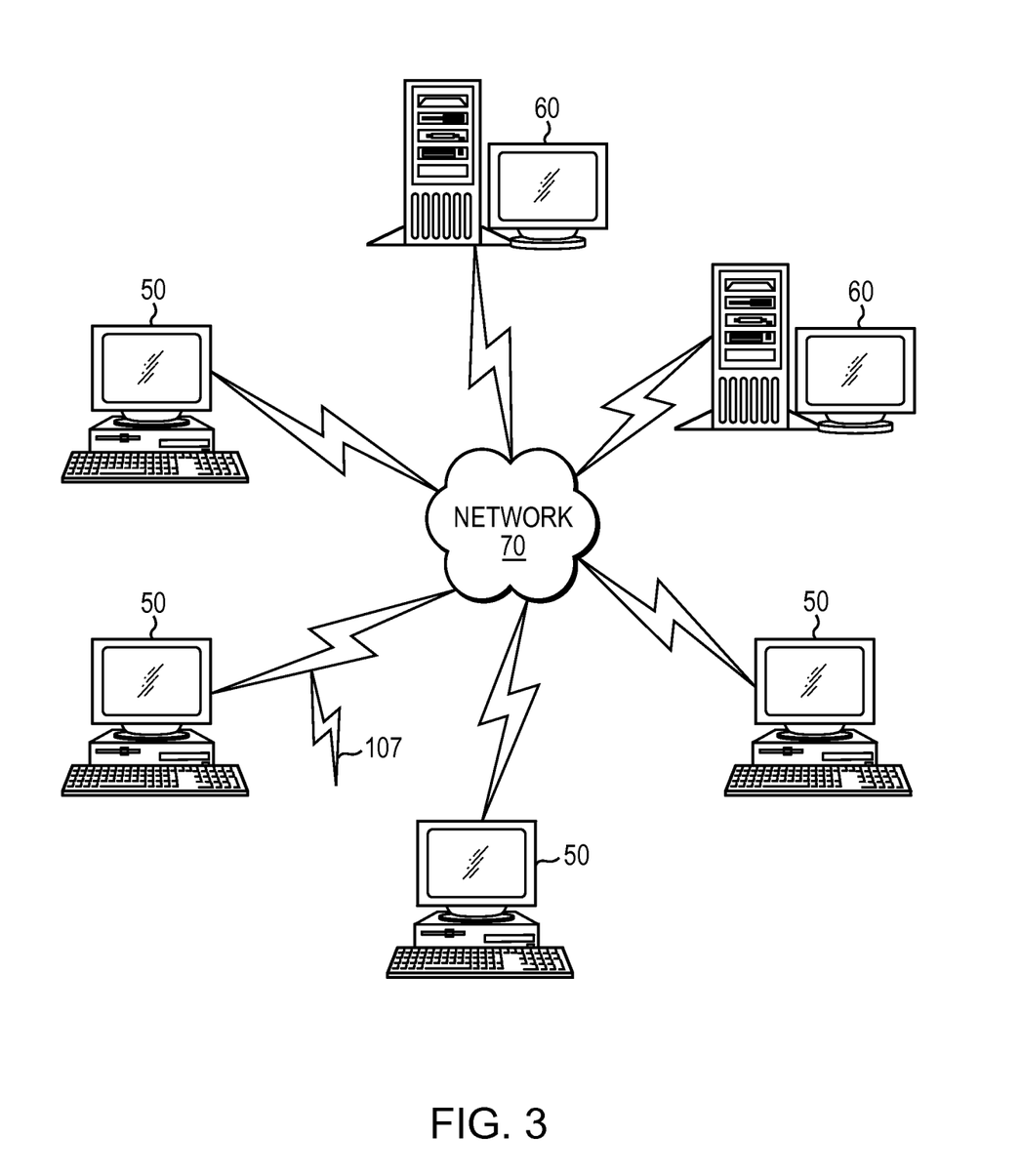
FIG. 3 is a schematic view of a computer network environment in which embodiments of the present invention operate.

FIG. 3 illustrates a computer network or similar digital processing environment in which the present invention may be implemented.

Client computer(s)/devices 50 and server computer(s) 60 provide processing, storage, and input/output devices executing application programs and the like. End user media player nodes/devices 17 in FIGS. 1a-1b are example clients 50, and media server 15 is a server computer 60. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 4:
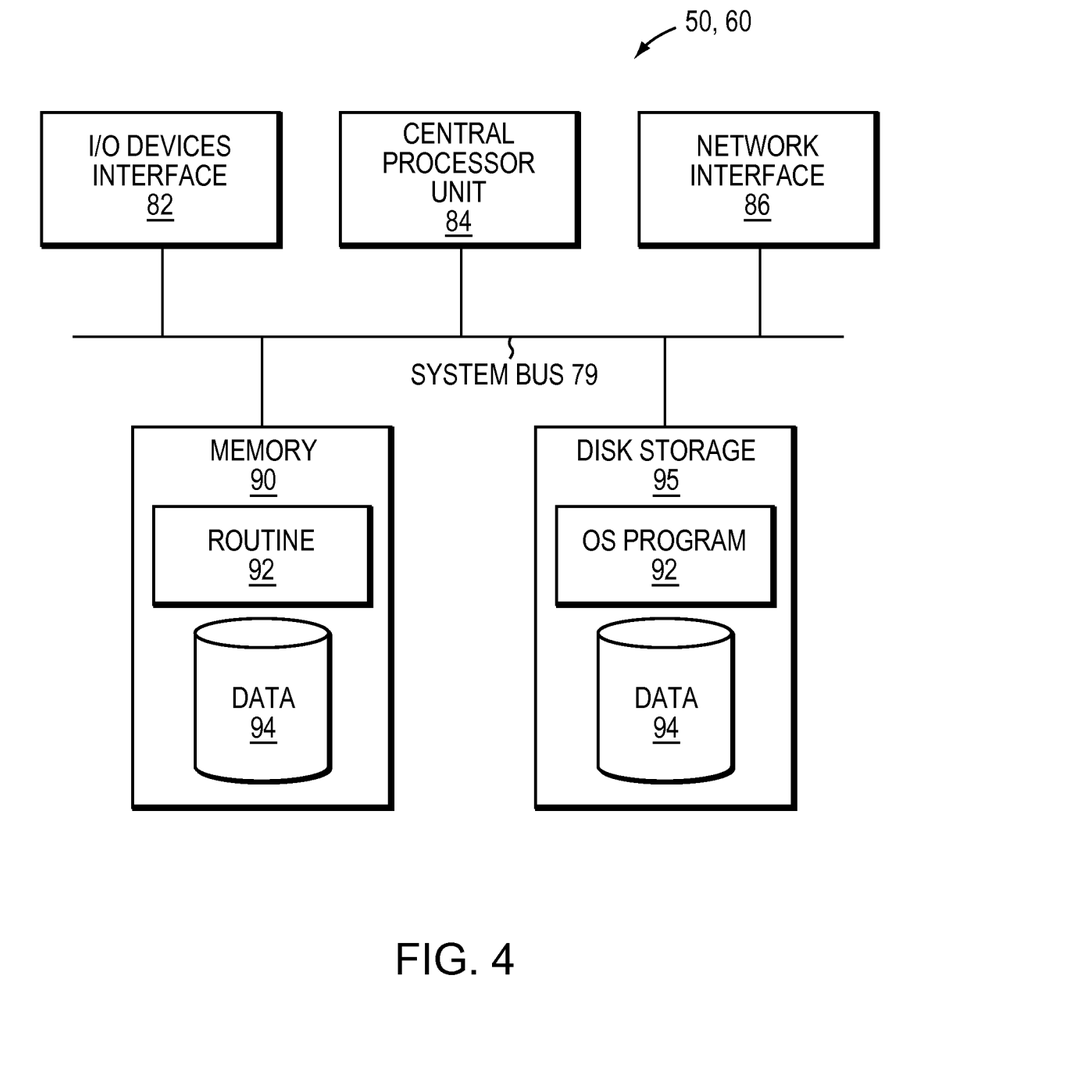
FIG. 4 is a block diagram of a computer node (device) in the network of FIG. 3.

FIG. 4 is a diagram of the internal structure of a computer (e.g., client processor/device 50 or server computers 60) in the computer system of FIG. 3. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 3). Memory 90 provides volatile storage for computer software instructions 92 and data 94 used to implement an embodiment of the present invention (e.g., awareness engine 31, EPG 21 and resulting indications 23, 34/screen views 24, 24a detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described above and below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 5:
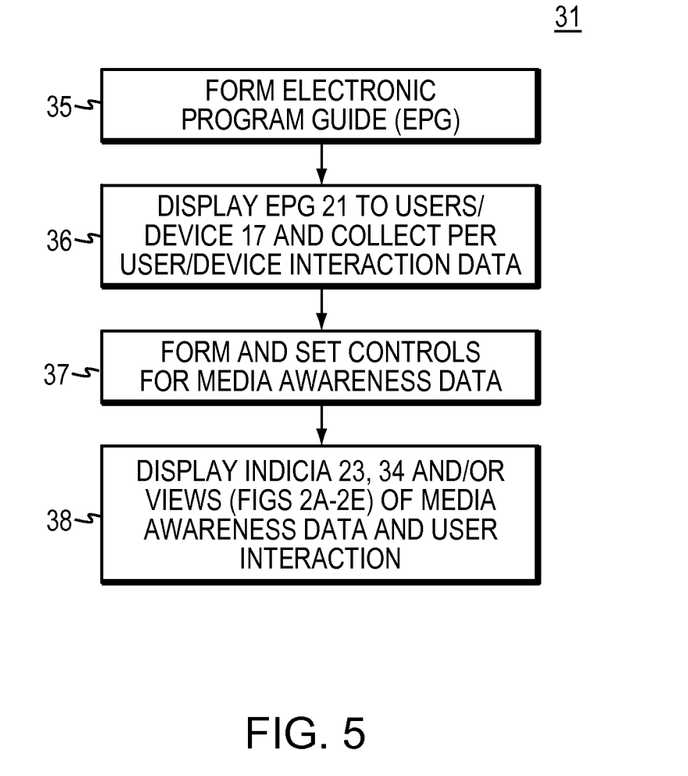
FIG. 5 is a flow diagram of a media awareness (processing/processor) engine of the present invention.

Referring now to FIG. 5, the media awareness (main processing) engine 31 in embodiments of the present invention forms or otherwise provides an electronic program guide (EPG) 21 in step 35 using programming guide information from various sources 13.

Next, engine 31 (step 36) displays the EPG 21 at the end user devices 17. Step 36 also monitors and collects end user and/or device 17 interaction with the contents (titles of media works 12, play dates/times, channel, etc.) in displayed EPG 21.

Step 36 passes the collected user/device 17 interaction data to step 37. In response, step 37 forms media aware data (for example, title, date and time and channel of media work 12 selected; name of user making the selection; percent of media work 12 viewed per named user; when viewed; and so on). Step 37 sets controls for sharing the formed media aware data (generally, awareness information). The controls may include range of social circles (family, friends, others) within which to share the awareness information, which media items (works) 12 or channels to include, and what portions of the awareness data or information to include.

In turn, step 38 generates appropriate output and displays media aware indications (icons) 23 and/or screen views 24, 24a discussed above in FIGS. 1 and 2a-2e. Other renderings (visual and/or audible) of the media aware/awareness information are suitable. In some embodiments, step 38 supports further user-interaction, such as VoIP conference calls of FIG. 2e, chat/call session menus 32 and indications 34 and pertinent operation of remote control 19 of FIG. 6.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

For example, FIGS. 3 and 4 refer to a client-server configuration. Other computer network architectures and configurations are suitable.

Further, the following by assignee may be considered to include related subject matter. Twitter (at twitter.com) is the latest phenomenon in blogging that involves short situational status oriented messages generated prolifically throughout the day ("social networking and microblogging") Assignees disclosure at U.S. patent application Ser. No. 12/114,257 filed on 2 May 2008 takes that concept one step forward by introducing a service on the television remote control which allow the television program which the user is currently watching to be sent to the blog along with the choice of one of several (optionally) customizable tags, e.g., "Lame", "My favorite", "Secret Obsession", "Go Noles!", etc. By incorporating this feature into the remote control, the couch potato user is saved the effort of manually entering the information into his blog.

What is claimed is:

1. A computer method of media viewing comprising:
providing an electronic program guide to at least one media viewer of a system, the electronic program guide listing different media works;
collecting in memory data generated by viewer interaction of two or more different viewers with the electronic program guide, interaction with the electronic program guide by the different viewers generating a data collection in memory indicative of viewer interaction by multiple different members of the system;
from the data collection, forming awareness information across the multiple different viewers indicating who is using which media works, including history information and live status information of the multiple different viewers including the at least one viewer; and
outputting to an end user indications of the awareness information including indications of who is using which media works, the end user being different than the at least one viewer, and wherein the output indications indicating who is using which media works provide a type of 2-way communications between the end user and the different viewers.

2. A computer method as claimed in claim 1 wherein viewer interaction includes any of user interaction and user device interaction.

3. A computer method as claimed in claim 1 wherein the collected data includes any of: title of media work selected by viewer interaction, play date and time of selected media work, channel that selected media work is scheduled to play on, media work currently being watched in an environment by multiple parties, names of users that have watched the media work, names of users that have requested more info on the media work, names of users that have scheduled a recording of the media work, names of users that have recommended the media work, names of users that have rated the media work, ratings of the media work, indications of users currently interacting with the media work, and social data gathered from social networking services.

4. A computer method as claimed in claim 1 wherein the awareness information includes any combination of: titles of media works selected, names of users making the selections, percent of selected media work viewed by named user, when viewed by named user, recommendation by users, rating by users, request by users, present status of users, and future selection of users.

5. A computer method as claimed in claim 1 wherein indications output include any of:
one icon indicating a media work that another user is currently viewing,
another icon indicating a media work that another user is scheduled to use in the future, and
a further icon indicating a media work that another user has played.

6. A computer method as claimed in claim 1 wherein the step of outputting further includes displaying screen views enabling user-to-user interaction, including an option to initiate a chat.

7. A computer method as claimed in claim 1 further comprising the step of limiting output based on any of:
range of social circle of the end user,
certain channel,
social networking service preferences, and
certain media work.

8. A computer method as claimed in claim 1 wherein one of viewers and end users are registered members of a media system, the media system deploying the method.

9. A computer method as claimed in claim 8 wherein the media system is any of:
a cable television system,
a satellite television system,
a social networking service, and
a global computer network media system.

10. A computer method as claimed in claim 1 wherein the media works are any of:
television shows,
movies,
video works,
audio works, and
music.

11. A media viewing system comprising:
a memory holding an electronic program guide displayed to at least one media viewer of a system, the electronic program guide listing different media works; and
a processor executing a digital processing engine operatively coupled to the electronic program guide, the digital processing engine (i) collecting data generated by viewer interaction of two or more different viewers with the electronic program guide, different viewers interacting with the electronic program guide generating a data collection by the digital processing engine, the data collection being indicative of viewer interaction by multiple different members of the system, (ii) forming, from the data collection, awareness information across the multiple different viewers, including history information and live status information of the multiple different viewers including the at least one viewer, said formed awareness information indicating who is accessing which media works, and (iii) outputting to an end user indications of the formed awareness information indicating who is accessing which media works, the end user being different than the at least one viewer, wherein the output indications indicating who is accessing which media works provide a type of 2-way communications between the end user and the different viewers.

12. A system as claimed in claim 11 wherein viewer interaction includes any of user interaction and user device interaction.

13. A system as claimed in claim 11 wherein the collected data includes any of: title of media work selected by viewer interaction, play date and time of selected media work, channel that selected media work is scheduled to play on, media work currently being watched in an environment by multiple parties, names of users that have watched the media work, names of users that have requested more info on the media work, names of users that have scheduled a recording of the media work, names of users that have recommended the media work, names of users that have rated the media work, ratings of the media work, indications of users currently interacting with the media work, and social data gathered from social networking services.

14. A system as claimed in claim 11 wherein the awareness information includes any combination of titles of media works selected, names of users making the selections, percent of selected media work viewed by named user and when viewed by named user, recommendation by users, rating by users, request by users, present status of users, and future selection of users.

15. A system as claimed in claim 11 wherein indications output include any of:
one icon indicating a media work that another user is currently viewing,
another icon indicating a media work that another user is scheduled access in the future, and
a further icon indicating a media work that another user has accessed.

16. A system as claimed in claim 11 wherein the digital processing engine further outputs to end users display screens that enable user-to-user interaction, including enabling at least one of a conference calling and an online chat service.

17. A system as claimed in claim 11 wherein the digital processing engine limits output based on any of:
range of social circle of the end user,
certain channel,
social networking service preferences, and
certain media work.

18. A system as claimed in claim 11 wherein:
one of viewers and end users are registered members of a media system; and
wherein the media system is any of:
a cable television system,
a satellite television system,
a social networking service, and
a global computer network media system.

19. A system as claimed in claim 11 wherein the media works are any of:
television shows,
movies,
video works,
audio works, and
music.

20. A computer program product for viewing media, the computer program product comprising:
a non-transitory computer readable medium having embodied therewith program instructions;
the program instructions including:
first program instructions to provide an electronic program guide to media viewers of a system, the electronic program guide listing different media works;
second program instructions to collect data generated by viewer interactions of two or more different viewers with the electronic program guide, different viewers interacting with the electronic program guide but generating one data collection by the second program instructions, the data collection being indicative of viewer interaction by multiple different members of the system;

third program instructions to form and output from the data collection to an end user awareness information across the multiple different viewers indicating which viewers are using which media works, including history information and live status information of the multiple different viewers, wherein the end user is different from the different viewers, and wherein the output awareness information indicating which viewers are using which media works provides a type of 2-way communications between the end user and the different viewers; and wherein the first, second and third program instructions are stored on said computer readable medium.

* * * * *